United States Patent Office 3,804,718
Patented Apr. 16, 1974

3,804,718
METHOD OF PRODUCING β-AMYLASE BY BACTERIAL FERMENTATION
Shigetaka Okada, Nara, and Masataka Higashibara, Todabayashi, Osaka-fu, Japan, assignors to Hayashibara Company, Limited, Okayama-ken, Japan
No Drawing. Filed Mar. 29, 1972, Ser. No. 239,345
Claims priority, application Japan, Apr. 1, 1971, 46/19,870; Sept. 30, 1971, 46/76,484
Int. Cl. C12d 7/02
U.S. Cl. 195—66 R    5 Claims

ABSTRACT OF THE DISCLOSURE

β-Amylase is produced by bacteria and can be recovered from the cell-free broths of their culture media. The bacterial β-amylases are the typical β-amylases and can act on starch, and convert the starch to maltose only.

---

This invention relates to starch-decomposing enzymes, and particularly to the preparation of β-amylases.

It is known to decompose starch by means of β-amylases which convert the starch to maltose. The known β-amylases are of vegetal origin, being found in malt, barley, and sweet potatoes.

β-Amylases have now been discovered also to be produced by bacteria. Suitable microorganisms have been found in soil samples collected near starch processing plants and in sewage. Plate cultures of the soil or sewage samples were made on bouillon-agar medium containing starch, and the microorganisms were screened initially according to the ability of the media of giving the iodine-starch reaction after culturing. The selected strains were transferred to respective liquid media containing 1% bouillon and 1% starch, and the cultures were incubated for two days at 30° C. with agitation whereupon the cells were removed by filtration.

One milliliter of each filtrate was mixed with an equal volume of 4% soluble starch solution, and the mixtures were allowed to stand overnight at 40° C. They were then subjected to paper chromatography with a butanol-pyridine-water solvent system and silver nitrate as a developer. The following microorganisms whose filtered broth produced a single spot of maltose in the paper chromatogram were selected for further investigation.

Bacillus megaterium B-8 _____ FERM-P 936
Bacillus megaterium _____ IFO 3003
Bacillus megaterium B-32 _____ FERM-P 937
Bacillus circulans _____ IFO 3329

Two of the strains identified by IFO accession numbers are known, and the others had the following bacteriological properties:

BACILLUS MEGATERIUM B-8 FERM–P 936

(1) Morphological characteristics

Vegetative cells:

Form: Rods, 1.0 to 1.5 by 2.0 to 5.0 microns, with rounded ends, sometimes irregular in shape with pointed ends, occurring singly or in short chains, sometimes in long chains.
Protoplasm: When lightly stained with methylene blue, protoplasm granular or foamy.
Shadow-forms: No shadow-forms.
Motility: Motile.
Gram stain: Gram-positive.
Budding: Buds at end or side of rods.

Spore and sporangia: Sporangia: Not distinctly swollen.
Spore:

Forms: 1.0 to 1.5 by 1.5 to 2.0 microns, ellipsoidal to cylindrical.
Position: Central to subterminal.
Walls: Thin.
Formation: Much formed in bouillon medium within 24 hours.

Agar medium:

Agar colonies: Round, entire, convex, non-spreading, glistening, creamy white.
Agar slants: Growth abundant, rought, beaded, glistening, translucent to opaque, non-adherent, soft, creamy white.
Glucose agar slants: Growth better and softer than on agar, rough, beaded, glistening, opaque, non-adherent, creamy white.
Glucose nitrate agar slants: Growth very heavy, raised, echinulate, creamy brownish yellow.
Tyrosine agar slants: Growth moderate, opaque, creamy white to yellow, beaded.
Soybean agar slants: Growth very heavy, echinulate, creamy orange-colored white, glistening.
Milk agar streak plate: Wide zone of hydrolysis of the casein.
Potato: Growth abundant, rough, raised, not glistening, lemon-yellow.
Potato agar slants: Growth very heavy, rough, raised, glistening, echinulate, creamy yellowish white.

(2) Physiological characteristics

Bouillon: Uniform turbidity with relatively abundant sediment. pH of broth is 7.8 at 30° C. in 15 days.
Glucose bouillon: Uniform turbidity with heavy sediment. pH of broth is 4.7 at 30° C. in 15 days.
Milk: Peptonized.
NaCl glucose bouillon: Growth up to a concentration of 8 percent. Faint growth in 9 to 10 percent.
Liquefaction of gelatin:

Gelatin stab: Stratiform liquefaction at 25° C.
Gelatin agar streak plate: Wide zone of hydrolysis at 30° C.

Utilization of sugars: Acid but no gas (with ammonium salts as sole source of nitrogen) from glucose, sucrose, mannitol, arabinose. Neither acid nor gas from xylose (at 30° C. for 7 days).
Hydrolysis of starch: Hydrolyzed.
Acetylmethylcarbinol: Not produced at 30° C. for 1 to 3 days.
Utilization of citrate as sole source of carbon: Utilized with Koser's citrate medium.
Nitrate reduction: Nitrite not produced from nitrate at 30° C. for 1 to 3 days.
Production of indole: Not produced at 30° C. for 1 to 3 days.
Methylene blue reduction: Not reduced.
Oxygen demand: No growth to scant growth in glucose bouillon under anaerobic conditions.
Growth temperature:
Optimum, between 30° C. and 40° C.
Maximum, between 45° C. and 50° C.

Catalase: Positive.

BACILLUS MEGATERIUM B–32 FERM–P 937

(1) Morphological characteristics

Vegetative cells:

Forms: Rods, 1.0 to 1.5 by 2.0 to 5.0 microns, occurring singly, pair, in short chains, in long chains with few side chains or in filaments.

Protoplasm: When lightly stained with methylene blue, protoplasm granular or foamy.
Shadow-form: No shadow-form.
Motility: Non-motile.
Gram stain: Gram-positive.
Budding: Buds at end or side of rods.

Spore and sporangia: Sporangia: Not distinctly swollen.
Spore:

Forms: 0.8 to 1.5 by 1.0 to 2.0 microns, ellipsoidal, sometimes irregular, almost spherical, reniform and oviform.
Position: Central to paracentral.
Walls: Thin.
Formation: Almost formed in bouillon medium within 24 hours.

Agar medium:
Colonies: Irregular, lobate.
Agar slants: Growth abundant, beaded, glistening, translucent to opaque, non-adherent, creamy white.
Glucose agar slants: Growth better and softer than on agar, rough, beaded, glistening, opaque, non-adherent, creamy white.
Glucose nitrate agar slants: Growth abundant, raised, creamy white to creamy yellow, echinulate, almost not glistening.
Tyrosine agar slants: Growth moderate, opaque, creamy white to creamy brownish yellow, beaded.
Soy bean agar slants: Growth very heavy, echinulate, creamy white to creamy orange-colored white, almost not glistening.
Milk agar streak plate: Wide zone of hydrolysis of the casein.
Potato: Growth abundant, raised, smooth, glistening to not glistening, wrinkly, creamy white.
Potato agar slant: Growth very heavy, rough, raised, somewhat glistening, echinulate, creamy white.

(2) Physiological characteristics

Bouillon: Uniform turbidity with relatively abundant sediment. pH of broth is 8.0 at 30° C. for 15 days.
Glucose bouillon: Uniform turbidity with heavy sediment. No pellicle on surface but thick and fragile ring pellicle.
Milk: Peptonized.
NaCl glucose bouillon: Growth up to a concentration of 8 percent. Faint growth in 9 to 10 percent.
Liquefaction of gelatin:

Gelatin stab: Slow stratiform liquefaction at 25° C.
Gelatin agar streak plate: Wide zone of liquefaction at 30° C.

Utilization of sugars: Acid but no gas (with ammonium salt as sole source of nitrogen) from glucose, sucrose, mannitol, arabinose, xylose.
Hydrolysis of starch: Hydrolyzed.
Acetylmethylcarbinol: Not produced at 30° C. for 1 to 3 days.
Utilization of citrate (as sole source of carbon): Utilized with Koser's citrate medium.
Nitrate reduction: Produced nitrite from nitrate.
Production of Indole: Not produced at 30° C. for 1 to 3 days.
Methylene blue reduction: Not reduced.
Oxygen demand: Aerobic, no growth to scant growth in glucose bouillon under anaerobic conditions.
Growth temperature:

Optimum, between 30° C. and 40° C.
Maximum, between 45° C. and 50° C.

Catalase: Positive.
Each of the strains could be cultivated in a shaken liquid culture, a static culture, or in a solid culture, and β-amylase accumulated in the culture medium after 2 to 3 days at 30° to 37° C.

The enzyme activity of the cell-free broths and of others aqueous liquids referred to hereinbelow was determined by mixing 1 ml. of the test liquid with 9 ml. 0.5% starch solution, incubating the mixture at the optimum pH for the tested amylase for 30 minutes at 40° C., and quantitatively determining the maltose formed by the method of Fehling-Lehmann-Schoorl. The enzyme activity which produced 10 mg. maltose under the stated conditions will be referred to as one unit.

The β-amylases produced by the several novel strains enumerated above differ slightly in their optimum pH range and their stable pH range as follows:

| Strain | B-32 | B-8 |
| --- | --- | --- |
| Optimum pH | 6.5 | 6.0 |
| Stable pH | 4.2-8.0 | 4.5-7.0 |

The β-amylase produced by above strain B-32 acts on starch to form maltose and β-limited dextrins. It is inactivated by p-chloromercuribenzoate (PCMB) and reactivated by cysteine. It is a protein having a molecular weight of approximately 50,000, but could not be isolated in a crystalline form. Its isoelectric point was found to be 9.14 by focusing electrophoresis in an ampholyte. Its optimum reaction temperature is between 50° and 65° C., and it is completely inactivated at 40° C. in two hours at a pH lower than 3.4 or higher than 9.5, also by heat treatment at pH 6.0 at 70° C. for 15 minutes.

When investigated by the oligosaccharide map method, these β-amylases were found to act on the non-reducing terminal residues of oligosaccharides to split them into maltose units, as typical β-amylases, by cutting the α-1,4-glucosidic bonds. They are equally effective on amylose, amylopectin, dextrins, and oligosaccharides.

The following examples are further illustrative of the invention.

EXAMPLE 1

A medium containing 5% milk casein, 2% corn steep liquor, 10% soluble starch, and enough water to make 15 liters was sterilized in a jar fermentor, adjusted to pH 7.0–7.2, and inoculated with B. megaterium B-32. The mixture was incubated at 30° C. for two days with stirring whereupon the broth showed an enzyme activity of 25.5 units per ml.

The culture was centrifuged at 8000 r.p.m. for 20 minutes to remove the cells, and the supernatant was mixed with enough solid ammonium sulfate to precipitate a crude enzyme product. It was dissolved in M/100 acetate, buffer solution, and the solution was dialyzed against running tap water for three days. Impurities still present were precipitated by adding 25% lead acetate solution drop by drop. The precipitate was removed by centrifuging.

The enzyme was again salted out with ammonium sulfate, dissolved in M/100 acetate buffer at pH 6, and the solution was heated 15 minutes at 60° C. It was dialyzed as above, and enzyme from the further purified solution was adsorbed on a molecular-sieve chromatographic medium (SE-Sephadex G-25), eluted with M/2 sodium chloride solution, and gel-filtered through Sephadex G-100. The active fraction was freeze-dried, and 2000 mg. solid material was recovered.

The product had a β-amylase activity of 100 units per mg., and thus had 50% of the enzyme activity of the original broth.

EXAMPLE 2

50 ml. batches of the medium described in Example 1 were sterilized in Sakaguchi flasks and inoculated respectively with B. megaterium B-8, B. circulans IFO 3329, and B. megaterium IFO 3003, incubated at 30° C. for two days with agitation, and the cultures were filtered to remove microbial cells. The filtrates had β-amylase activities of 13, 15, and 3 units per ml. respectively, and were worked up as in Example 1 to produce a purified, solid enzyme product of high activity.

Solutions of soluble starch were mixed with 5 units of the respective enzyme products per gram of starch, the mixtures were incubated for 10 hours at 55° C., and then analyzed by paper chromatography as described above. Only spots of maltose were found.

The culture collections from which specimen cultures of microorganisms referred to herein are available are identified in this specification as follows:

IFO: Institute for Fermentation—Osaka City
FERM–P: Fermentation Research Institute, Agency of Industrial Science and Technology—Chiba City

What is claimed is:

1. A method of producing β-amylase which comprises:
   (a) culturing a microorganism of the genus Bacillus capable of producing extracellular β-amylase in a medium containing starch until said β-amylase is accumulated; and
   (b) recovering the accumulated β-amylase from said medium.

2. A method as set forth in claim 1, wherein said starch is converted to maltose during said culturing.

3. A method as set forth in claim 1, wherein said microorganism, when grown on a bouillon-agar medium containing starch, converts the starch in said bouillon-agar medium to maltose.

4. A method as set forth in claim 1, wherein said microorganism is a strain of *Bacillus megaterium*.

5. A method as set forth in claim 1, wherein said microorganism is *Bacillus megaterium* FERM–P 936, *Bacillus megaterium* FERM–P 937, *Bacillus megaterium* IFO 3003, or *Bacillus circulans* IFO 3329.

References Cited

Chem Abstracts 74: 86338d (1971).
Chem Abstracts 73: 53174y (1970).
Mazza et al., Applied Microbiology, p. 535 (1970), vol. 19.
Chem Abstracts 68: 439d (1968).

A. LOUIS MONACELL, Primary Examiner
T. G. WISEMAN, Assistant Examiner

U.S. Cl. X.R.
195—31 R